United States Patent [19]
Zechmann et al.

[11] Patent Number: 6,019,442
[45] Date of Patent: Feb. 1, 2000

[54] METHOD AND DEVICE FOR CONTROLLING THE BRAKING SYSTEM IN A VEHICLE

[75] Inventors: Juergen Zechmann, Heilbronn; Stefan Diehle, Korntal-Muenchingen, both of Germany

[73] Assignee: Robert Bosch GmbH, Stuttgart, Germany

[21] Appl. No.: 08/988,875

[22] Filed: Dec. 11, 1997

[30] Foreign Application Priority Data

Dec. 20, 1996 [DE] Germany .................... 196 53 230

[51] Int. Cl.$^7$ ...................................... B60T 8/32
[52] U.S. Cl. ............................. 303/186; 303/155
[58] Field of Search .................... 303/116.1, 116.2, 303/163, 167, 186–190; 364/426.01, 426.023, 426.026, 426.028, 426.035, 426.036; 701/69, 81, 83

[56] References Cited

U.S. PATENT DOCUMENTS

| | | | |
|---|---|---|---|
| 5,021,957 | 6/1991 | Yoshino et al. | 364/46.01 |
| 5,540,488 | 7/1996 | Tevazawa et al. | 303/116.1 |
| 5,560,690 | 10/1996 | Hattori et al. | 303/116.2 |
| 5,752,211 | 5/1998 | Takasaki et al. | 701/69 |
| 5,842,755 | 12/1998 | Sugimoto et al. | 303/186 |

FOREIGN PATENT DOCUMENTS

| | | |
|---|---|---|
| 0 509 237 | 10/1992 | European Pat. Off. |
| 195 10 746 | 9/1996 | Germany. |
| 195 11 152 | 10/1996 | Germany. |

*Primary Examiner*—Chris Schwartz
*Attorney, Agent, or Firm*—Kenyon & Kenyon

[57] ABSTRACT

In a method of controlling a braking system in a vehicle, the action of the brakes is distributed between at least one front and one rear wheel by adjusting at least the braking pressure in the brakes on one of the rear wheels in order to establish a difference between the braking pressure on the front wheel and that on the rear wheel. The difference established between the braking pressure on the front wheel and that on the rear wheel is decreased in the presence of a prescribable condition. The presence of the prescribable condition depends at least on a detected parameter that represents the longitudinal velocity of the vehicle, and the established difference is continuously decreased. The time at which the level of pressure on the rear-wheel brake can be safely equalized to that of the pressure on the front-wheel brake can be reliably determined because the time at which the braking-force distribution that enhances safe driving is no longer necessary is narrowly related to the longitudinal velocity of the vehicle. Furthermore, the continuous equalization of pressure reduces or eliminates the reaction perceived in the brake pedal by the driver and increases driving comfort.

10 Claims, 6 Drawing Sheets

METHOD AND DEVICE FOR CONTROLLING THE BRAKING SYSTEM IN A VEHICLE

BACKGROUND INFORMATION

Controlling the braking system in a vehicle is described in German Patent Application No. DE 195 10 746, where the action of the brakes is distributed between at least one front and one rear wheel by adjusting at least the braking pressure in the brakes on one rear wheel in order to establish a difference between the braking pressure on the front wheel and that on the rear wheel. The resulting difference can be diminished only by the driver of the vehicle decreasing the front-wheel braking pressure. The valve or valves employed to establish the braking-pressure difference in a system of this nature can be subjected to excessive thermal stress. It is also possible for the driver of the vehicle to discontinue the operation of the vehicle (by turning off the ignition and accordingly interrupting the supply of current or voltage) while still actuating the brake. In this event the established difference will cause the brake pedal to "give way" when the ignition is turned off, meaning that the resistance perceived by the driver to be exerted by the brake pedal will be noticeably decreased by the sudden pressure adjustment, which is unpleasant for the driver.

European Patent No. EP 0 509 237 (corresponding to U.S. Pat. No. 5,281,012) describes electronic braking force distribution.

A method and device for controlling braking pressure by actuating a solenoid valve is described in German Patent Application No. DE 196 20 037.7 (not a prior publication). This valve comprises a coil and a movable armature. Current or voltage is supplied to the coil to move the armnature. The supply is synchronized to a prescribable pulse duty factor, allowing the valve to be operated as a switching valve, turning off and on in synchronization. This approach ensures smooth braking-pressure variation.

A system for establishing the distribution of braking force between front and rear wheels is described in German Patent Application No. DE 195 11 152. This system is particularly intended for emergency operation, where a controller increases and decreases pressure on at least the rear-wheel brakes so that the alternating increase and decrease generate a saturation pressure on the rear-wheel brakes at a level below that of an admission pressure previously established by the driver. The components are protected from thermal stress when the driver applies the brakes for a long period of time by the emission subsequent to a prescribable maximal interval of a series of pressure-increasing pulses that ramp the rear-wheel braking pressure up to the admission pressure prescribed by the driver. The series of pressure-increasing pulses are generally perceived by the driver of the vehicle in the form of unpleasant pulsations in the brake pedal. An attempt is also made to ensure that the driving safety-enhancing difference between the braking pressure on the front wheel and that on the rear wheel will not decrease until it is certain that the decrease will not lead to driving-critical situations.

An object of the present invention is to ensure pleasant and safe braking-action distribution.

SUMMARY OF THE INVENTION

The present invention provides a system of controlling the braking system in a motor vehicle in which the braking action is distributed between at least one front wheel and one rear wheel by adjusting the braking pressure in at least the brakes on one of the rear wheels. This pressure is regulated by establishing a difference between the braking pressure on the front wheel and that on the rear wheel. The difference established between the braking pressure on the front wheel and that on the rear wheel is decreased in the presence of a prescribable condition.

The presence of the prescribable condition depends at least on a detected parameter that represents the longitudinal velocity of the vehicle, and the established difference is continuously decreased. The time at which the level of pressure on the rear-wheel brake and that of the pressure on the front-wheel brake can be safely equalized can be reliably determined in accordance with the present invention because the time at which the braking-force distribution that facilitates safe driving is no longer necessary is narrowly related to the longitudinal velocity of the vehicle. Furthermore, the continuous equalization of pressure in accordance with the present invention reduces or eliminates the above-mentioned reaction perceived in the brake pedal by the driver and increases driving comfort.

The established difference is decreased in one advantageous embodiment of the present invention by continuous approximation of the braking pressure on the rear wheel to that on the front wheel. The pressure on the front wheel is generally the pressure established by the driver by means of the brake pedal and main brake cylinder.

The prescribable condition during which the pressure adjustment in accordance with the present invention occurs can in particular be present when the detected parameter that represents the longitudinal velocity of the vehicle fails to attain a prescribable threshold. This is because the braking force distribution that increases driving safety can be safely decreased or continuously disengaged at low vehicle velocities.

The established difference can be continuously decreased by pulse-width modulated actuation of at least one solenoid valve that controls the braking pressure on the rear wheel. These valves can in particular be the intake valves that supply braking pressure to the rear-wheel brakes in in-themselves known anti-lock, traction control, or driving-dynamics regulating systems. A particular advantage here is that the valves are actuated by pulse-width modulation. Since such valves are normally open when no current is flowing through them, the rear-wheel braking pressure can be limited by supplying enough current to the intake valves to close them. The pulse-width modulated actuation needed for pressure equalization in accordance with the present invention is ensured by a prescribable continuous diminishment of the current in the solenoid valve.

DETAILED DESCRIPTION

Figure 1:
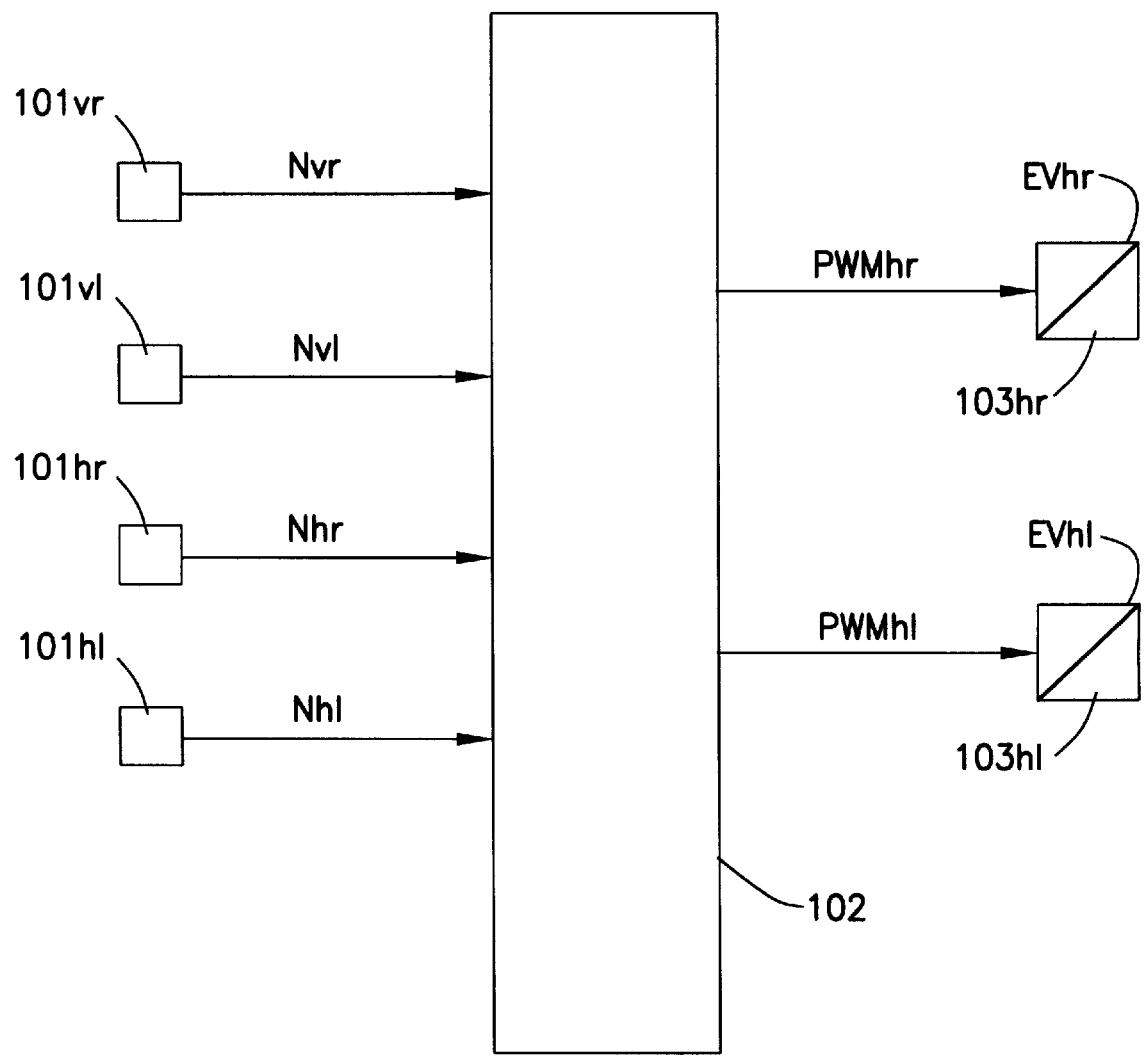
FIG. 1 shows a block diagram of an electronic braking-force distributor.

FIG. 1 is a schematic block diagram of the components of an electronic braking-force distributor for a four-wheeled vehicle. Signals from wheel-speed detectors 101ij are forwarded to controller 102. The I index indicates association with either the rear or the front axle and the j index association with either the right or left side of the vehicle. The time T1 (FIG. 4) at which, subsequent to application of the brakes at time T2, rear-wheel braking pressure $P_{HA}$ no longer follows the front-wheel braking pressure is determined from the detected wheel speed by an in-itself known procedure (See, for example, European Patent No. EP 0 509 237/U.S. Pat. No. 5,281,012 or German Patent Application No. DE 195 10 746). This is done by actuating the intake valves 103hr and 103hl associated with the rear-wheel brakes. Such intake valves are used in vehicles with an in-itself known anti-lock, traction control, or driving-dynamics regulating system to interrupt the supply of braking pressure to the wheels. The valves are normally open when no current is flowing through them. If the rear-wheel braking pressure is to be limited at time T1 (FIG. 4), an appropriately dimensioned current (actuating signal $PWM_{ij}$) is forwarded to intake valves 103ij.

Figure 2:
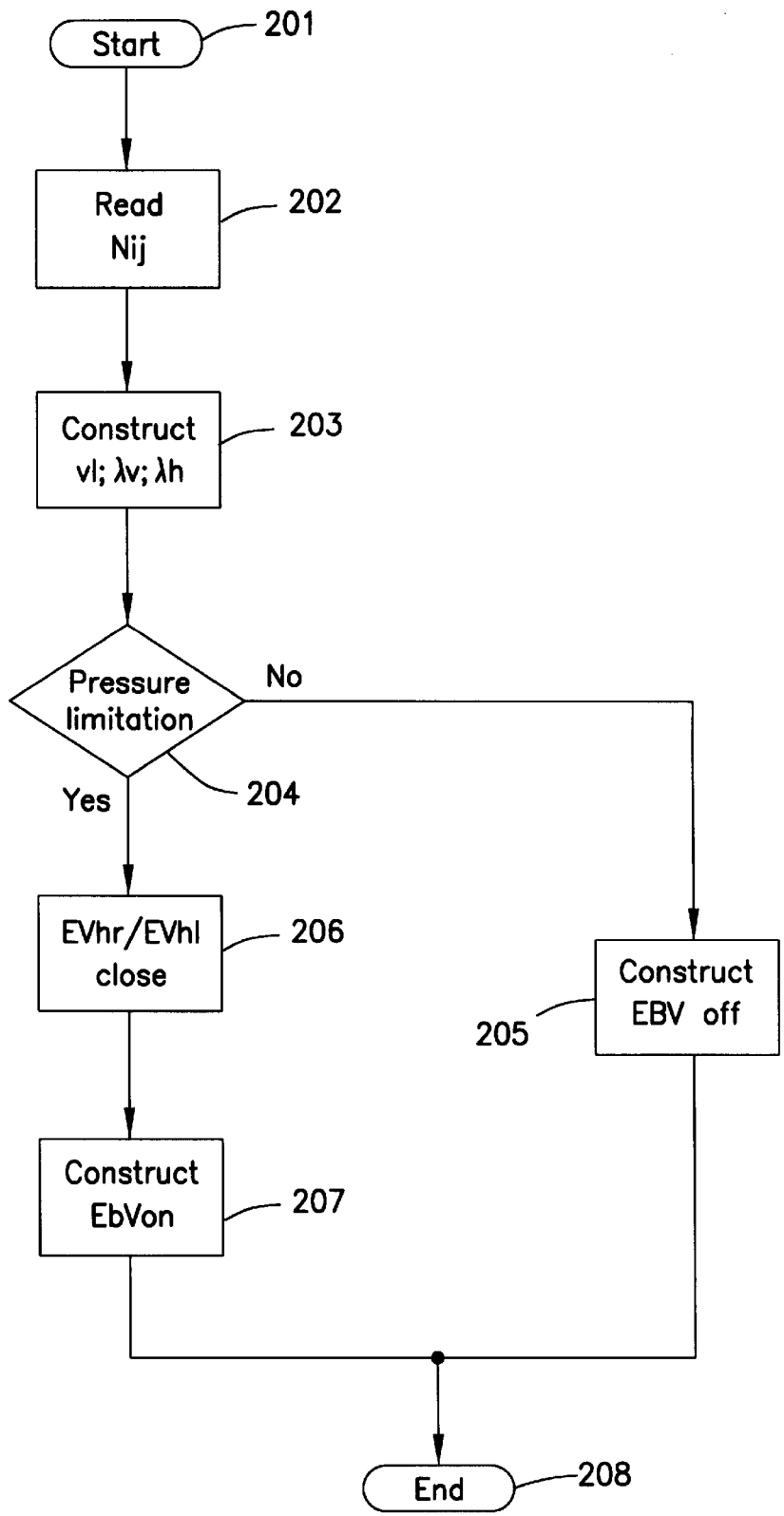
FIG. 2 shows a first flow chart illustrating the operation of an electronic braking-force distributor.

FIG. 2 schematically illustrates what happens in an electronic braking-force distributor of the type known, for example, from the above-mentioned German Patent Application No. DE 195 10 746 or European Patent No. EP 0 509 237 (U.S. Pat. No. 5,281,012). Start step 201 is followed by a step 202, where velocity signals Nij are read. A parameter $V_1$ representing the longitudinal velocity of the vehicle is constructed by known procedures from these signals Nij during step 203. Front and rear wheel slippages $\lambda v$ and $\lambda h$ respectively can be derived therefrom. In step 204 it is determined by known procedures from the slippage (or directly from wheel speeds Nij) whether the braking pressure on the rear wheels should be limited. If not, a signal $EBV_{off}$ is constructed in step 205. If the braking pressure on the rear wheels should be limited, intake valves 103ij are actuated in step 206 and a signal $EBV_{on}$ constructed in step 207. An end step 208 leads to repetition of the sequence illustrated in FIG. 2.

Figure 3:
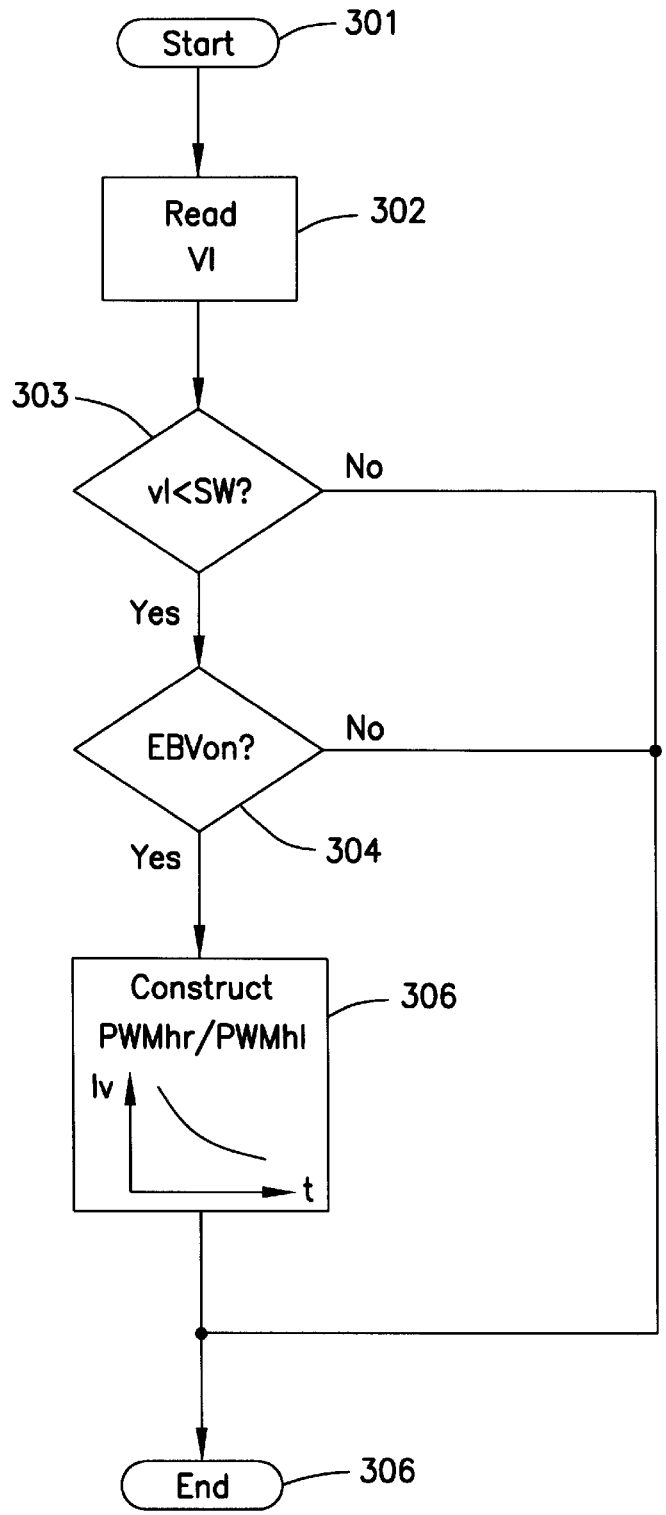
FIG. 3 shows a second flow chart illustrating the operation of an electronic braking-force distributor.

The sequence illustrated in FIG. 3 can take place parallel to the one illustrated in FIG. 2. A start step 301 is followed by a step 302, wherein the parameter $V_1$ constructed in step 203 (FIG. 2) and representing the longitudinal velocity of the vehicle is read. In step 303, velocity $V_1$ is compared with a threshold SW, which can for example be approximately 3 km/h. If the velocity exceeds the threshold, the procedure is immediately terminated at end step 306.

If on the other hand longitudinal velocity $V_1$ fails to attain threshold SW, a query is conducted in step 304 to determine whether the EBV signal constructed in step 207 is at that time an $EBV_{on}$ signal. An $EBV_{on}$ signal would indicate that the pressure is currently being limited and that thus a difference exists between the pressure on the rear wheel and that on the front wheel. In this event, step 304 is followed by step 305, wherein the current Iv applied to solenoid valve 103ij, which is closed at this time, T3, is continuously diminished in accordance with a prescribable function over time. Valves 103ij and their pulse-width modulated actuation PWMij will now be specified with reference to FIGS. 5 through 8.

If the query conducted in step 304 indicates that the braking pressure is not currently being limited, the procedure is immediately terminated at end step 306 and the sequence illustrated in FIG. 3 repeated.

Figure 4:
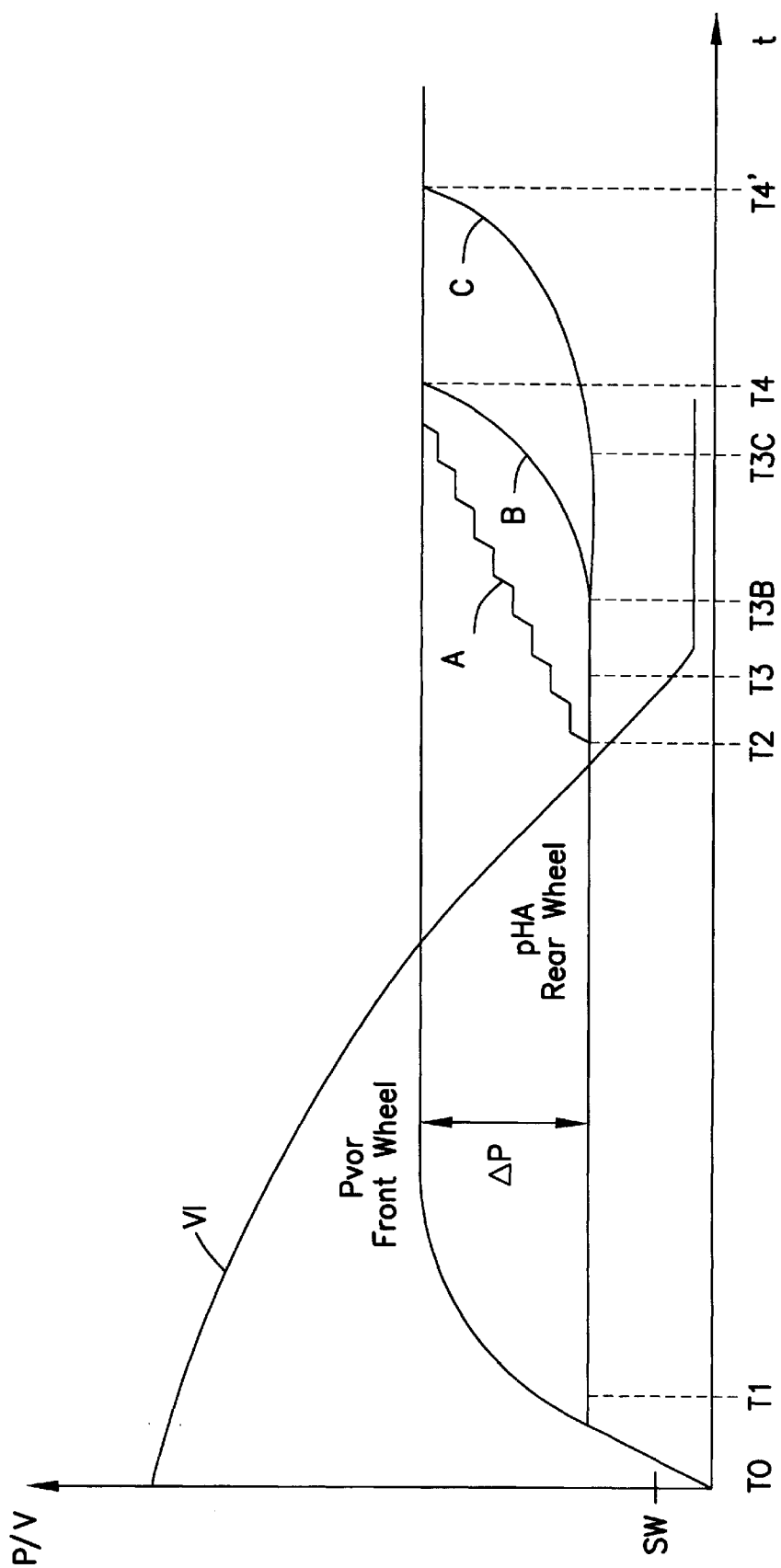
FIG. 4 shows a graph of pressure and velocity according to the present invention.

FIG. 4 illustrates the behaviors of or chronological correlation between longitudinal vehicle velocity $V_1$, admission pressure $P_{vor}$, and rear-axle braking pressure $P_{HA}$ over time.

Admission pressure $P_{vor}$ is conventionally established by the driver by way of the brake pedal and main brake cylinder and is identical with the braking pressure on the front wheel.

The driver actuates the brake pedal at time T0, supplying braking pressure equally to the front and rear wheels. Pressure limitation is initiated at rear-wheel brakes at time T1 (FIG. 2, step 204). The braking pressure $P_{vor}$ on the front wheels will accordingly continue to increase while the braking pressure $P_{HA}$ on the rear wheels reaches saturation. Longitudinal vehicle velocity $V_1$ decreases while the vehicle is being braked.

As will be evident from FIG. 4, a pressure difference $\Delta P$ resulting from the absolute value of the difference between braking pressures $P_{vor}$ and $P_{HA}$ will prevail at the end of a braking procedure accompanied by braking-pressure limitation. This difference should not be maintained too long, especially when maintaining it will no longer increase driving safety. This is the case when for example the driver has braked for a traffic light (on an upward slope for instance). In this event the driver will be holding the brake pedal down even though the vehicle is not moving. If difference $\Delta P$ is maintained too long, intake valve 102ij can be subjected to excessive thermal stress. Still, even if solenoid valves 103ij are designed with pulse-width modulated actuation to endure a long-lasting difference $\Delta P$, it makes no engineering sense to maintain such a function as electronic braking-force distribution any longer than necessary.

Too long maintenance of difference $\Delta P$ can also lead to the behavior that will now be described.

A driver turning off the ignition with the pedal still down after braking will perceive the brake pedal surprisingly and irritatingly giving way when the supply of current or voltage to the intake valves is discontinued and the valves begin to equalize the pressures more or less abruptly.

Pressure equalization is accordingly initiated, as will be evident from FIG. 4, upon termination of the braking procedure.

When the driver keeps the brakes applied for a long time, the components can be protected from thermal stress as described in German Patent Application No. DE 195 11 152 by a series of pressure-increasing pulses emitted upon expiration of a prescribed maximal interval of time. This situation is represented in FIG. 4 by the curve A commencing at time T2. As previously mentioned, this series of pressure-increasing pulses is usually perceived by the driver of the vehicle in the form of unpleasant pulsations in the brake pedal. It is also important to ensure that the driving-safety enhancing difference between the braking pressure on the front wheel and that on the rear wheel will not decrease until it is certain that the decrease will not lead to driving-critical situations.

Equalization of the braking pressure is initiated in accordance with the present invention at time T3, which occurs when longitudinal vehicle velocity $V_1$ drops below a lower threshold, 3 km/h for instance (FIG. 3, step 303). The condition tested for in step 304, the presence $EBV_{on}$ of braking-pressure limitation and hence of a difference $\Delta P$ that needs to be decreased, is satisfied at time T3.

The pressure is equalized at time T3 in accordance with the present invention, not by a series of pressure-increasing pulses (curve A), or even by the sudden opening of valves 103ij, but by actuating the valves so that the adjustment will occur slowly and continuously (non-stepwise) as represented by curve B or C. How such a continuous actuation can be achieved through the pulse-width modulated actuation described in German Patent Application No. DE 196 20 037.7 (not a prior publication) as the point of departure will now be specified.

Figure 5:
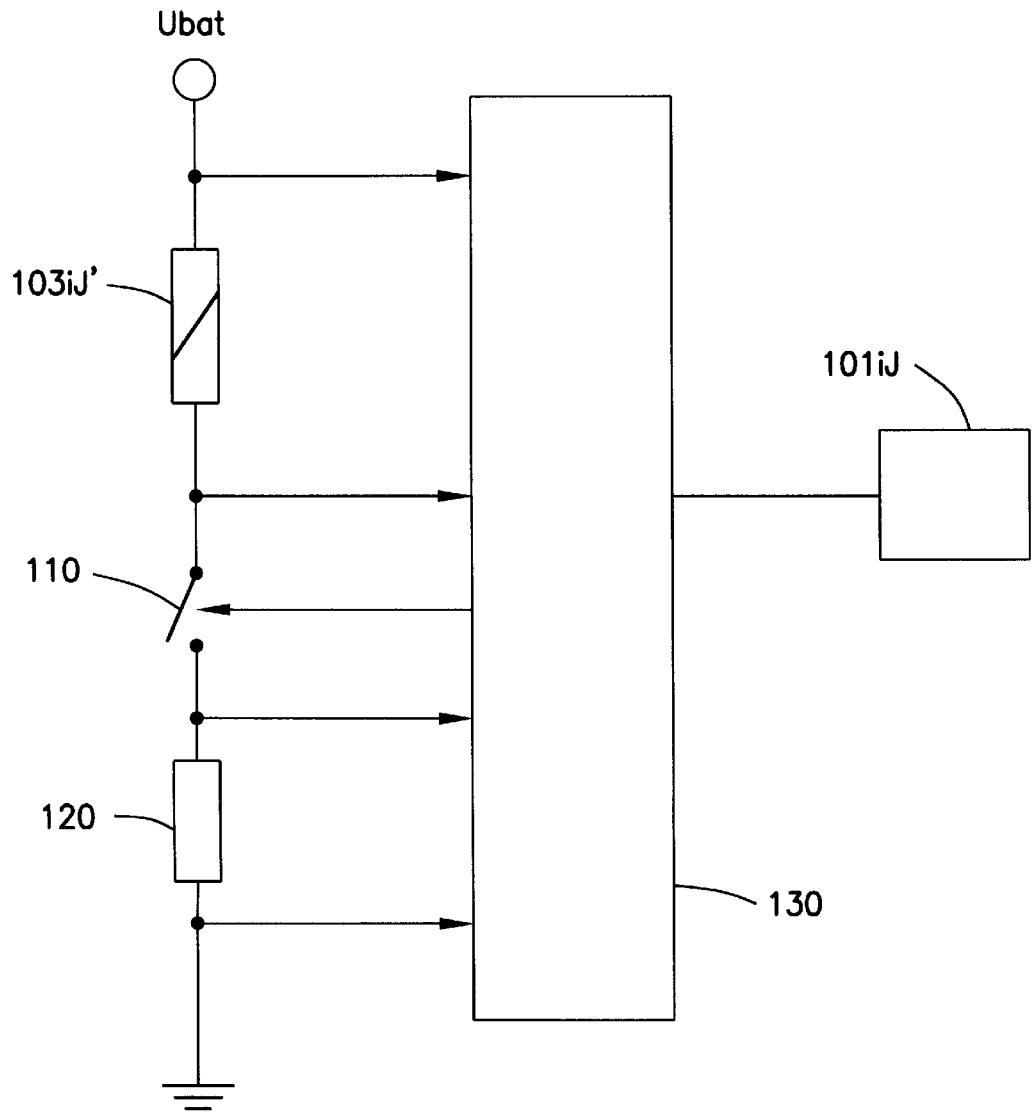
FIG. 5 shows a block diagram illustrating pulse-width modulated actuation of a valve.

FIG. 5 shows the essential components involved in pulse-width modulated actuation. Load 103ij is supplied with battery voltage Ubat through its first terminal. Its second terminal communicates with switching means 110. Switching means 110 connects the load's second terminal to ground through a resistor means 120. Load 103ij, switching means 110, and ammeter means 120 are connected in series. The sequence is illustrated by way of example in FIG. 5. The components can, however, be connected differently. Load 103ij is constituted by the coils of the solenoid valves 103ij illustrated in FIG. 1. Switching means 110 is preferably a transistor, in particular a field-effect transistor.

Signals from sensors 101ij (See FIG. 1) are forwarded to controller 130, which is part of the control unit 102 illustrated in FIG. 1. The potentials at the input terminals of load 103ij' and ammeter means 120 are forwarded to controller 130, which in turn forward actuating signals to switching means 110.

Controller 130 calculates signals for actuating switching means 110 from the signals detected by speed sensors 101ij. Voltage U at load 103ij' and/or the current I flowing through the load 103ij' are detected and processed. Current I is determined from the voltage drop at resistor means 120.

Figure 6:
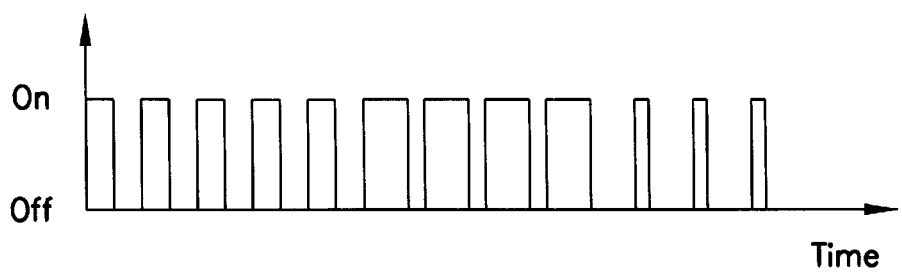
FIG. 6 shows a graph of an actuation signal plotted over time.

The actuating signal forwarded to switching means 110 is plotted over time in FIG. 6. The actuation is timed, meaning that the signal changes from its low to its high level at a prescribable fixed frequency, so that switching means 110 will close and transmit the current.

Once a prescribable time has elapsed, the signal will return to its low from its high level, and switching means 110 will open as a result. The switching will preferably occur at a frequency that valves 103ij cannot emulate, and they will accordingly respond to the mean actuating signal. This frequency can for example be 1 to 2 KHz. The ratio of the time during which the signal assumes its high level to that during which it assumes its low level is the pulse duty factor TV. PDF TV and battery voltage Ubat yield an effective voltage Ueff and an effective current Iv. In order to compensate for the effect of battery voltage Ubat on effective voltage Ueff, at least battery voltage Ubat must be taken into consideration when PDF TV is prescribed.

Figure 7:
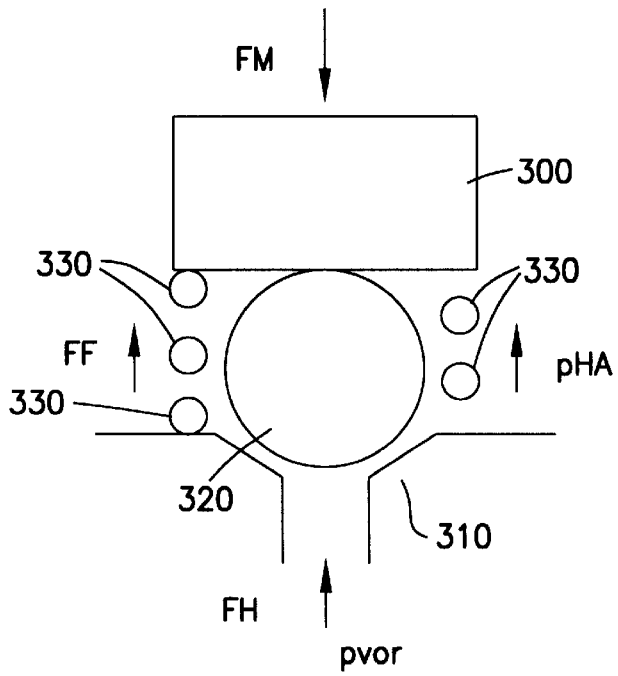
FIG. 7 illustrates the relationships between the forces in a solenoid valve.

FIG. 7 illustrates the relationships between the forces in the solenoid valve in principle. A magnetic force FM acts on an armature 300. The valve includes a seat 310 and a needle 320. Armature 300 is subjected to the resilient force exerted by a spring 330. Needle 320 is subjected to a hydraulic force FH that is parallel to magnetic force FM. Hydraulic force FH derives from the difference between rear-wheel braking pressure $P_{HA}$ and front-wheel or admission pressure $P_{vor}$. In FIG. 7, pressure $P_{vor}$ is being applied to needle 320 from below and pressure $P_{HA}$ from above. Magnetic force FM opposes both resilient force FF and hydraulic force FH.

No current can flow as long as switching means 110 is open, and the level of magnetic force FM will be zero. The solenoid valve will accordingly be open, with needle 320 lifted off seat 310. Hydraulic fluid will flow between the seat 310 and the needle 320.

When sufficient voltage is applied to the coil, magnetic force FM will exceed the sum of resilient force FF and hydraulic force FH. Spring 330 will be compressed, and needle 320 will come into contact with seat 310, interrupting the flow of fluid and separating rear-wheel braking pressure $P_{HA}$ from admission pressure $P_{vor}$.

How slow and continuous pressure adjustment can be achieved with a valve of this nature will now be specified.

Pulse-width modulation of actuating signal $PWM_{ij}$ (FIG. 1, and FIG. 3, step 305), i.e., by modification of PDF TV, will decrease (ramp down for instance) effective voltage Ueff and hence effective current $I_v$ slowly and according to a prescribable curve to zero. Magnetic force FM will also be correspondingly decreased. Consequently, the pressure that keeps the valve closed will slowly decrease and the valve will begin to open.

Figure 8:
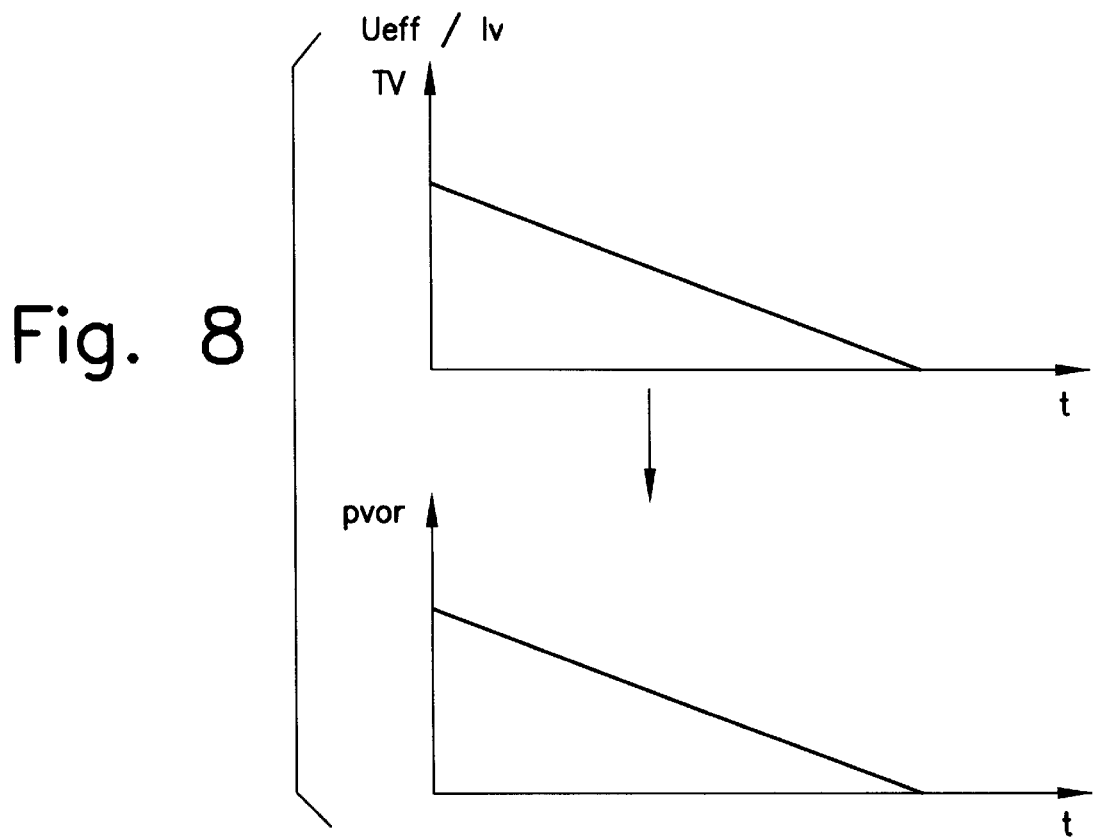
FIG. 8 shows various signals plotted over time.

Hydraulic opening force FH, resilient force FF, and magnetic closing force FM will all be in equilibrium, and the speed at which tHe pressure decreases can be adjusted. FIG. 8 illustrates effective voltage Ueff, effective current Iv, or PDF TV admission pressure $P_{vor}$ as a function of time t.

To open the solenoid valve, PDF TV is decreased according to a predefinable function (ramped down for instance) to zero over time t from the starting level needed to keep the valve closed. The effective voltage Ueff or effective current Iv applied to the valve will accordingly also decrease similarly (ramp down for instance) over time, as will the supply pressure $P_{vor}$ that maintains the valve closed. Once this pressure attains the prevailing admission pressure, the needle will slowly rise and slowly allow the hydraulic fluid to flow. As PDF TV continues to decrease, needle 320 will continue to rise, increasing the effective opening cross section.

The pulse-width modulated actuation in accordance with the present invention will vary effective voltage Ueff and effective current Iv over time so that armature 300 and hence needle 320 will begin to move slowly. The prescribable PDF TV will for this purpose preferably vary in a prescribable manner, ramped for example, meaning that it will decrease linearly to zero over time from its initial level. Instead of a test ratio, other parameters that affect effective voltage Ueff can also be ramped down over time. Since the motion is so gradual, the hydraulic fluid will not be released all at once, but will increase the pressure on valve 103ij slowly and continuously, and pressure difference ΔP will also decrease slowly and continuously.

The time T3B or T3C (FIG. 4) at which the pressure equalization actually begins and the rate of that adjustment will depend on the supply pressure initiated by the driver actuating the brake pedal and on how rapidly coil current Iv and coil voltage Ueff decrease. Current and voltage do not vary linearly but can be applied or adjusted to the behavior of the particular valve by way of PDF TV.

What is claimed is:

1. A method for controlling a braking system in a vehicle having front wheels and rear wheels, comprising the steps of:

distributing a braking action between at least one of the front wheels of the vehicle and at least one of the rear wheels of the vehicle by establishing a pressure difference between a first braking pressure on the at least one front wheel and a second braking pressure on the at least one rear wheel by adjusting the second braking pressure; and continuously decreasing the pressure difference as a function of a predetermined condition, the predetermined condition being a function of a detected longitudinal velocity of the vehicle.

2. The method according to claim 1, wherein the decreasing step includes the step of continuously approximating the second braking pressure to the first braking pressure.

3. The method according to claim 1, wherein the predetermined condition is present when the detected longitudinal velocity is different than a predetermined threshold value.

4. The method according to claim 1, wherein the pressure difference is decreased by a pulse-width modulated actuation of at least one solenoid valve that controls the second braking pressure.

5. The method according to claim 4, wherein the actuation is performed by continuously decreasing a current in the at least one solenoid valve.

6. A device for controlling a braking system in a vehicle having front wheels and rear wheels, comprising:

means for distributing a braking action between at least one of the front wheels of the vehicle and at least one of the rear wheels of the vehicle by establishing a pressure difference between a first braking pressure on the at least one front wheel and a second braking pressure on the at least one rear wheel by adjusting the second braking pressure;

at least one sensor for detecting a longitudinal velocity of the vehicle; and means for continuously decreasing the pressure difference as a function of a predetermined condition, the predetermined condition being a function of the detected longitudinal velocity of the vehicle.

7. The device according to claim 6, wherein the pressure difference is decreased by continuously approximating the second braking pressure to the first braking pressure.

8. The device according to claim 6, wherein the predetermined condition is present when the detected longitudinal velocity is different than a predetermined threshold value.

9. The device according to claim 6, further comprising:

at least one solenoid valve for controlling the second braking pressure; and a controller for providing a pulse-width modulated actuation of the at least one solenoid valve.

10. The device according to claim 9, wherein the actuation is performed by continuously decreasing a current in the at least one solenoid valve.

\* \* \* \* \*